(12) United States Patent
Afroz et al.

(10) Patent No.: US 11,645,403 B2
(45) Date of Patent: May 9, 2023

(54) DATA SHARING AND STORAGE CONTROL SYSTEM AND METHOD

(71) Applicant: Avast Software s.r.o., Prague (CZ)

(72) Inventors: Sadia Afroz, Berkeley, CA (US); Armin Wasicek, El Cerrito, CA (US)

(73) Assignee: Avast Software s.r.o., Prague (CZ)

( * ) Notice: Subject to any disclaimer, the term of this patent is extended or adjusted under 35 U.S.C. 154(b) by 234 days.

(21) Appl. No.: 17/028,182

(22) Filed: Sep. 22, 2020

(65) Prior Publication Data

US 2022/0092198 A1 Mar. 24, 2022

(51) Int. Cl.
*G06F 21/62* (2013.01)
*G06F 16/51* (2019.01)
*G06K 9/62* (2022.01)
*G06F 21/60* (2013.01)

(52) U.S. Cl.
CPC ......... *G06F 21/6209* (2013.01); *G06F 16/51* (2019.01); *G06F 21/602* (2013.01); *G06K 9/6267* (2013.01); *G06V 2201/10* (2022.01)

(58) Field of Classification Search
CPC .... G06F 21/6209; G06F 16/51; G06F 21/602; G06F 2221/2141; G06F 21/6218; G06K 9/6267; G06V 2201/10; G06V 20/70
See application file for complete search history.

(56) References Cited

U.S. PATENT DOCUMENTS

| | | | |
|---|---|---|---|
| 9,582,681 B2 | 2/2017 | Mirsha | |
| 9,875,346 B2* | 1/2018 | Pitschel | H05K 999/99 |
| 10,412,434 B1* | 9/2019 | Matthews | H04N 21/4394 |
| 10,798,294 B1* | 10/2020 | K C | H04N 5/23206 |
| 2007/0113293 A1* | 5/2007 | Blumenau | G06F 16/13 707/E17.01 |
| 2010/0228730 A1* | 9/2010 | Muller | G06F 16/93 707/E17.058 |
| 2013/0263001 A1* | 10/2013 | Doronichev | G06F 21/554 715/719 |

(Continued)

FOREIGN PATENT DOCUMENTS

WO 2013016663 1/2013

OTHER PUBLICATIONS

A. C. Squicciarini, A. Novelli, D. Lin, C. Caragea and H. Zhong, "From Tag to Protect: A Tag-Driven Policy Recommender System for Image Sharing," 2017 15th Annual Conference on Privacy, Security and Trust (PST), Calgary, AB, 2017, pp. 337-33709, doi: 10.1109/PST.2017.00047.

(Continued)

*Primary Examiner* — Carl G Colin
*Assistant Examiner* — Hany S. Gadalla
(74) *Attorney, Agent, or Firm* — Dovas Law, P.C.

(57) ABSTRACT

A data sharing control method. The method includes detecting a plurality of images on one or more devices operated by a first user, the one or more devices comprising a particular device. A plurality of tags are determined for the plurality of images, and a plurality of settings are received based on the plurality of tags from a second user. A particular image is detected on the particular device. One or more particular tags of the particular image on the particular device are determined, and a sharing action of the particular image by the particular device is blocked based on the plurality of settings and the one or more particular tags.

34 Claims, 12 Drawing Sheets

(56) References Cited

U.S. PATENT DOCUMENTS

| | | | | |
|---|---|---|---|---|
| 2015/0348185 A1* | 12/2015 | Frost | .................. | G06Q 40/02 |
| | | | | 705/35 |
| 2016/0014262 A1* | 1/2016 | Hodges | ............ | H04M 1/72436 |
| | | | | 455/419 |
| 2021/0133337 A1* | 5/2021 | Adams | ................ | G06F 21/6254 |

OTHER PUBLICATIONS

Ashwini Tonge, Cornelia Caragea, Image Privacy Prediction Using Deep Neural Networks, arXiv:1903.03695v1 [cs. CV] Mar. 8, 2019.
Peter F. Klemperer, Yuan Liang, Michelle L. Mazurek, Manya Sleeper, Blase Ur, Lujo Bauer, Lorrie Faith Cranor, Nitin Gupta, Michael K. Reiter, Tag, You Can See It! Using Tags for Access Control in Photo Sharing, Conference on Human Factors in Computing Systems—Proceedings, 10.1145/2207676.2207728, May 1, 2012.

* cited by examiner

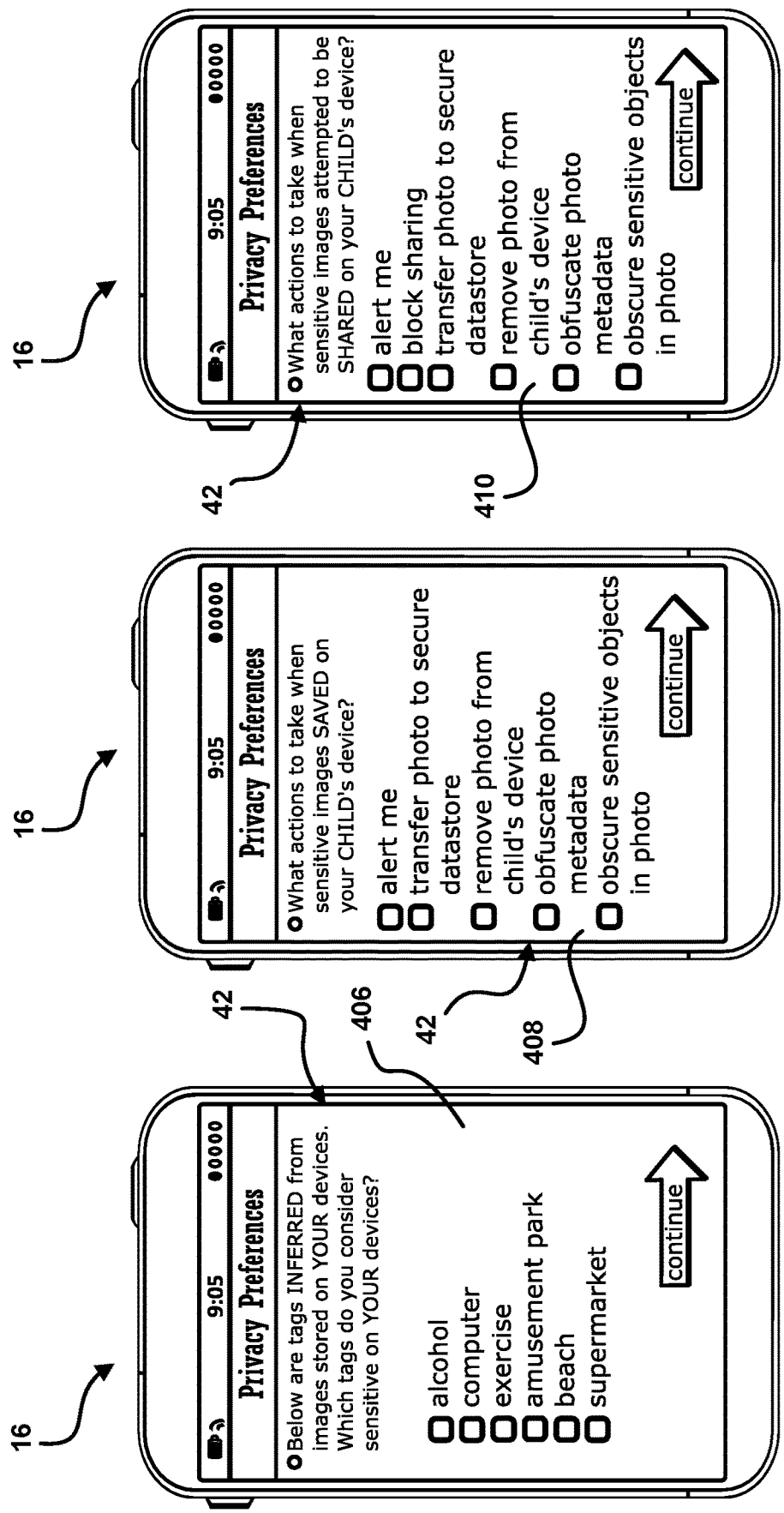

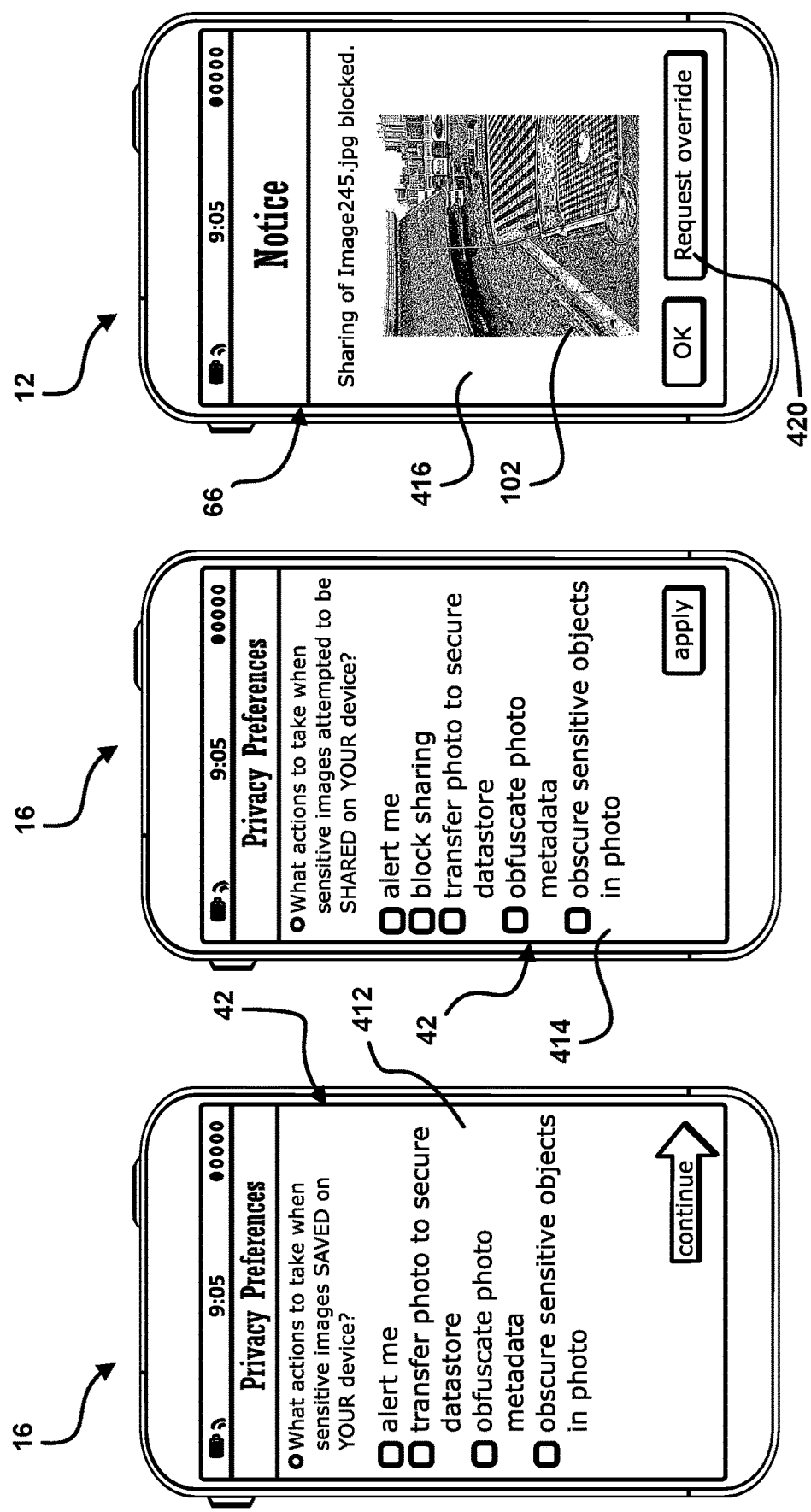

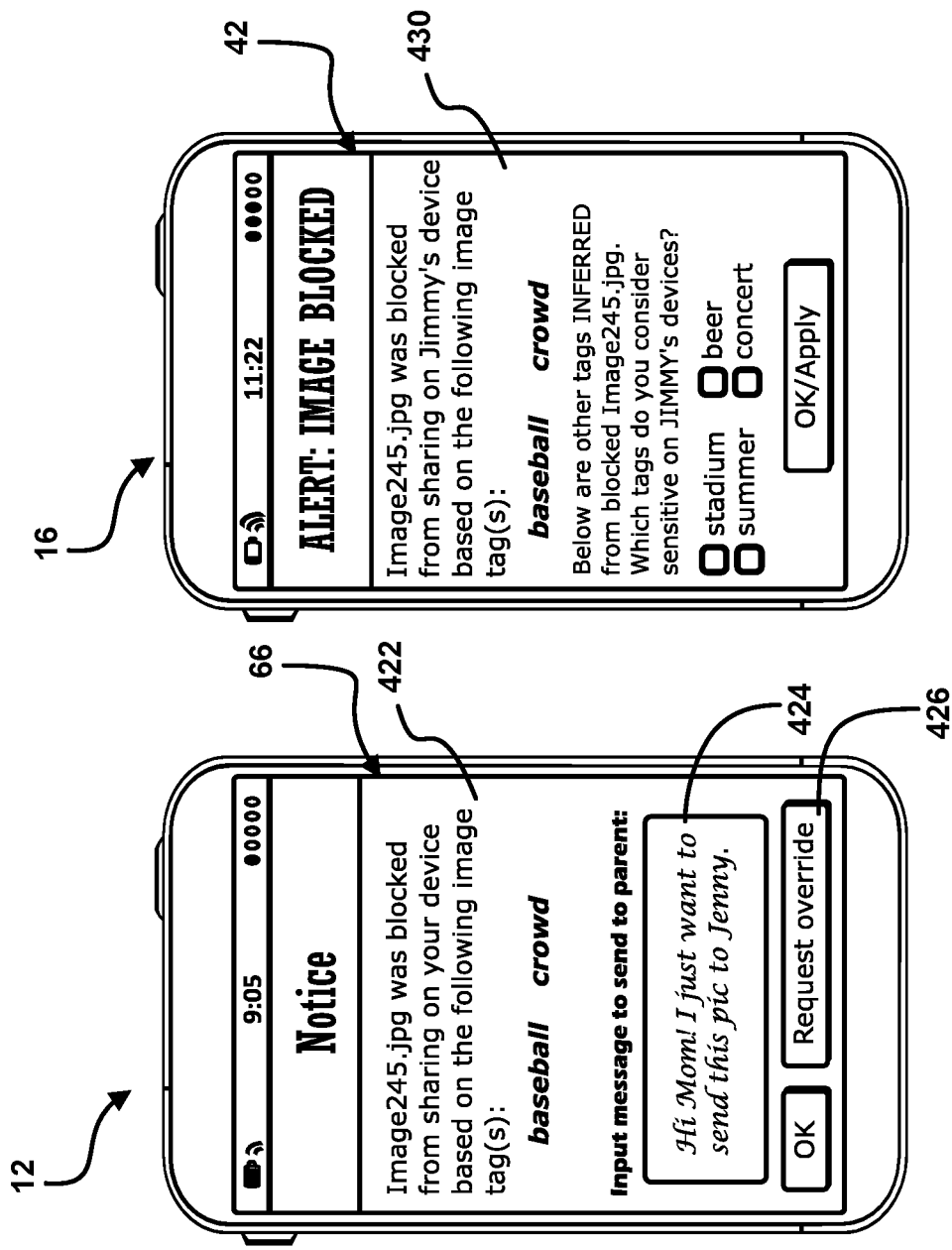

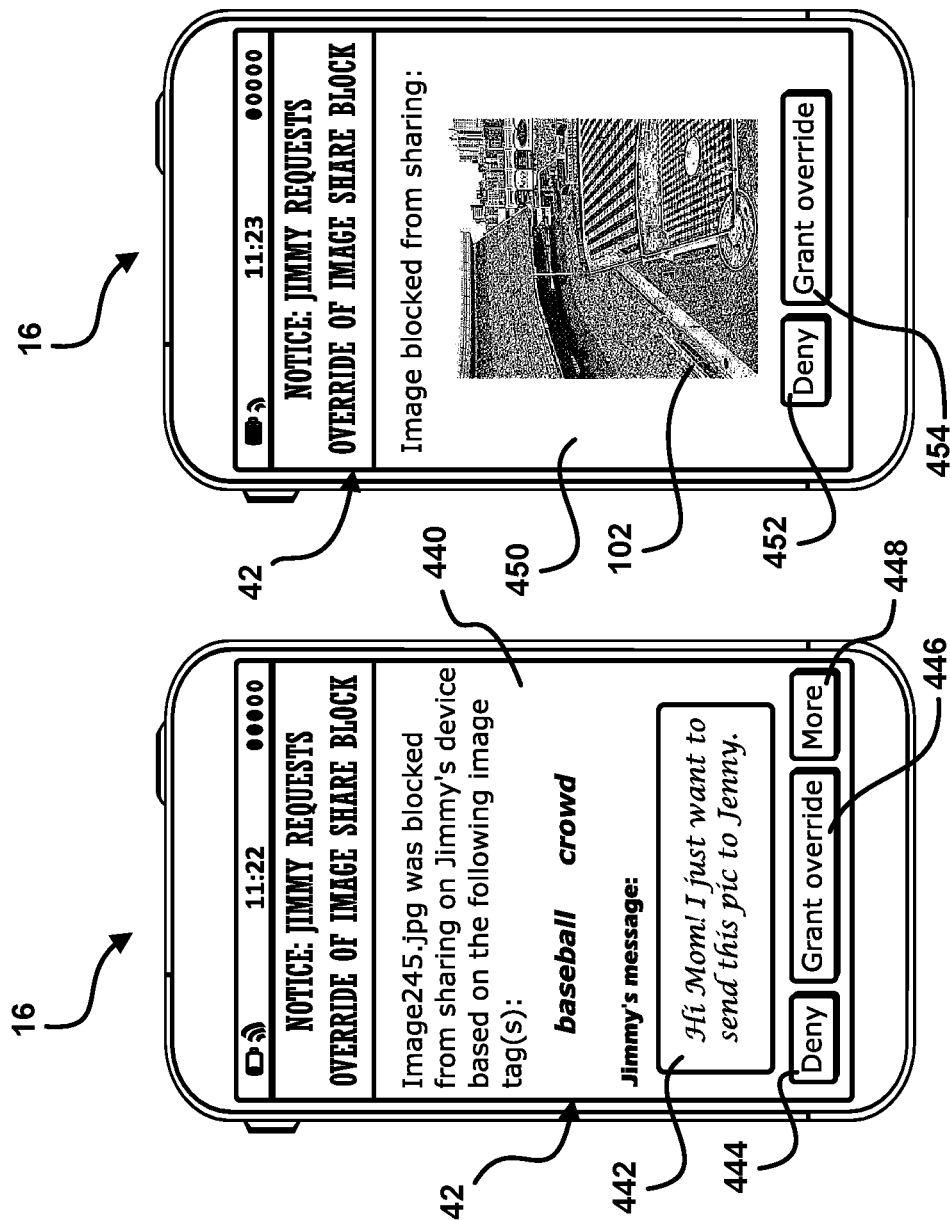

DATA SHARING AND STORAGE CONTROL SYSTEM AND METHOD

FIELD OF INVENTION

The invention relates generally to computing device control, and more particularly to restricting data sharing and storage by a computing device.

BACKGROUND

Images stored by computing devices either locally or via remote or cloud based storage services can be a privacy risk. Smart phones, tablet computers, laptops and personal computers for instance may be enabled to capture and store images, and users may be enabled to share such images with other users or services via applications executed by the devices. Users may not even be aware when they are sharing privacy sensitive images.

Privacy sensitive images can include for example images showing credit card numbers and images including indications of location, for instance including image location. Users may unwittingly send image data with private or identifying information, for example exchangeable image file format ("Exif") data. Children may send to or receive from their peers explicit images despite parents' efforts to restrict such activity.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A data sharing control method is provided. The method includes detecting a plurality of images on one or more devices operated by a first user, the one or more devices comprising a particular device. A plurality of tags are determined for the plurality of images, and a plurality of settings are received based on the plurality of tags from a second user. A particular image is detected on the particular device. One or more particular tags of the particular image on the particular device are determined, and a sharing action of the particular image by the particular device is blocked based on the plurality of settings and the one or more particular tags.

Further provided is a network-enabled device control system. The control system includes a first computing system including at least a first processor and at least a first non-transitory computer readable storage medium having encoded thereon first instructions that when executed by the at least the first processor cause the first computing system to perform a first process. The first process includes detecting a plurality of images on the first computing system, determining a plurality of tags for the plurality of images, transmitting via a network the plurality of tags, detecting a particular image on the first computing system, determining one or more particular tags of the particular image, and blocking a sharing action of the particular image. The control system further includes a second computing system including at least a second processor and at least a second non-transitory computer readable storage medium having encoded thereon second instructions that when executed by the at least the second processor cause the second computing system to perform a second process. The second process includes receiving the plurality of tags from the first computing system, querying a second user based on the plurality of tags, receiving a plurality of settings from the second user, and transmitting the plurality of settings to the first computing system, wherein the blocking the sharing action of the particular image by the first computing system is based on the plurality of settings and the one or more particular tags.

Further provided is a data storage control method. The data storage control method includes detecting a plurality of images on one or more devices operated by a first user, the one or more devices including a particular device. A plurality of tags for the plurality of images are determined, and a plurality of settings based on the plurality of tags are received from a second user. A particular image is detected on the particular device, and one or more particular tags of the particular image on the particular device are determined. A security action is performed on the particular image on the particular device based on the plurality of settings and the one or more particular tags.

Further provided is a method including detecting a plurality of images on one or more devices operated by a user, the one or more devices including a particular device. A plurality of tags are determined for the plurality of images, a plurality of settings are received from the user based on the plurality of tags. A particular image is detected on the particular device, and one or more particular tags of the particular image on the particular device are determined. A security action is performed on the particular image on the particular device based on the plurality of settings and the one or more particular tags.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIGS. 5A-5H show example interactive displays for receiving control settings for controlling data transmission and storage on computing devices according to the illustrative embodiments.

FIGS. 5I-5M show example interactive displays for providing alert notices regarding data transmission on controlled computing devices.

DETAILED DESCRIPTION OF ILLUSTRATIVE EMBODIMENT(S)

Figure 1:
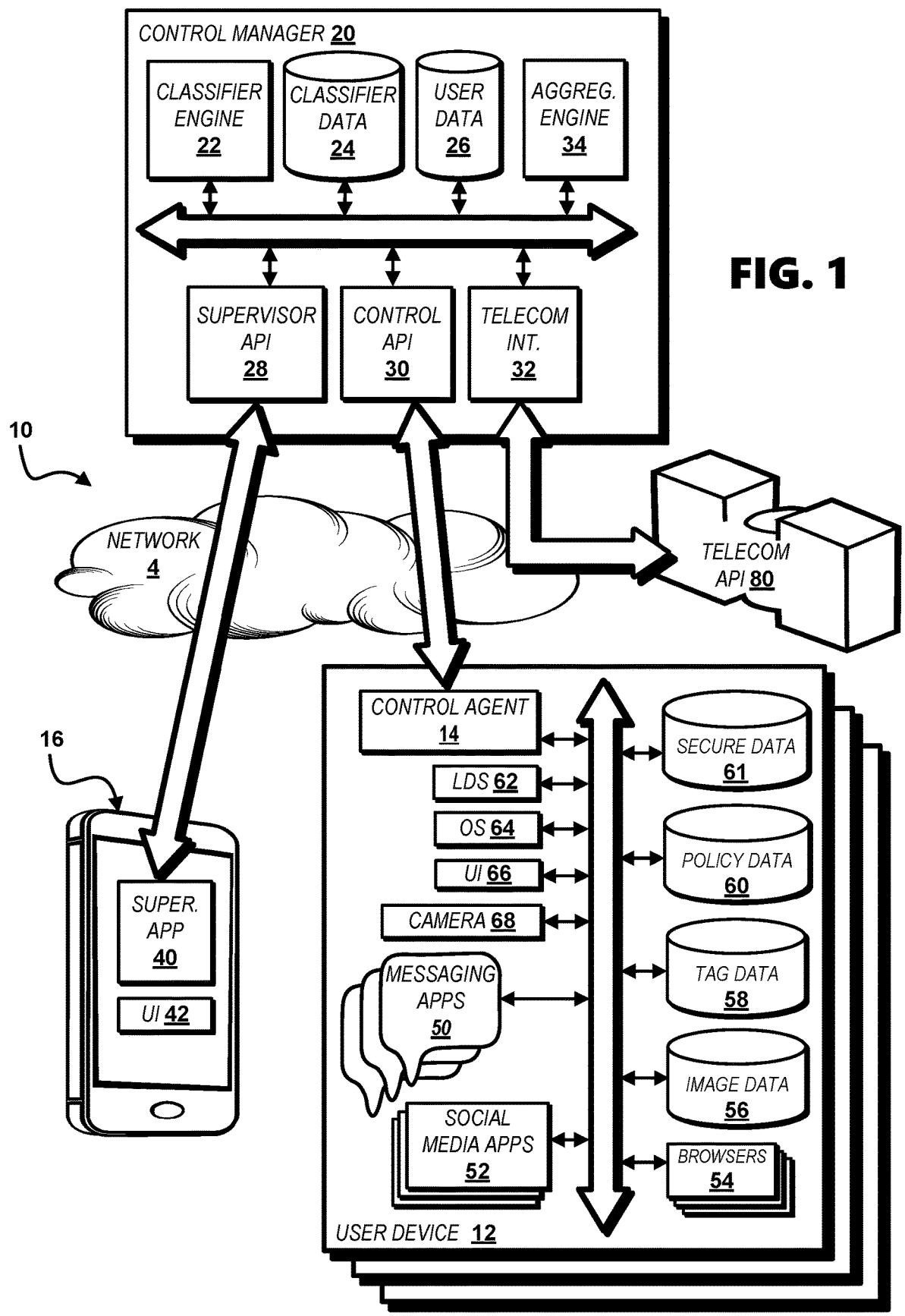
FIG. 1 shows a system enabling controlling data transmission and storage on computing devices according to illustrative embodiments.

Embodiments of the invention are described below with reference to the drawing figures wherein like numerals represent like elements throughout. The terms "a" and "an" as used herein do not denote a limitation of quantity, but rather denote the presence of at least one of the referenced items.

Referring to FIG. 1, a system 10 for enabling control of a computing device 12 (hereinafter "user device 12") is provided in a communications network 4 including one or more wired or wireless networks or a combination thereof, for example including a local area network (LAN), a wide area network (WAN), the Internet, mobile telephone networks, and wireless data networks such as WiFi™ and 3G/4G/5G cellular networks. The system 10 permits a supervisory user operating another computing device 16 (hereinafter "supervisor device 16") to set controls for a plurality of user devices 12 operated by a supervised user. The system 10 further permits a supervisory user to set controls on their own supervisor device 16. The supervisory user for example can include a parent, and the supervised user for example can include a child of the parent.

A supervisory user is enabled to provide settings for controlling a supervised user's electronic activity, particularly the storage and sharing of images. Electronic activity analysis and image analysis of electronic chats, messages, and conversations is enabled via a network-connectable processor-enabled control manager 20 and a control agent 14 across a plurality of digital platforms. The system 10 via the control manager 20 and control agent 14 on the user devices 12 provides alerts to supervised users and alerts and activity summaries to supervisory users.

Particularly, the system 10 enables identification of sensitive images on a user device 12 by application of a sensitive image classification algorithm via the control agent 14. Sensitive images can be removed or deleted from the user device 12 by the control agent 14 or transferred to a secure datastore 61 beneficially encrypted and password protected, which may be inaccessible or accessible to a supervised user. Alternatively, suggestions of images which should potentially be removed or deleted or transferred to a secure datastore 61 can be provided to a supervisory user via a supervisor application 40 on a supervisor device 16. Social media channels or applications enabling image sharing can be blocked. A supervisory user can be notified if a supervised user (e.g., their child), or if they themselves, share sensitive images. A supervisory user can be alerted of habits of a supervised user on social media, for example whether a supervised user shares sports images, school images, or party images. A supervisory user can be alerted of whether a supervised user has attempted or has succeed in circumventing blocked social media channels, for example via web-based screen capture services. A supervisory user can be informed of what kinds of images (e.g., sports images, party images) a supervised user stores on their user device 12. The supervisory user can be provided a summary of a supervised user's images. Further, image metadata of a supervised user's images can be obfuscated via the control agent 14 either automatically or based on input by the supervisory user via the supervisor application 40. Moreover, image metadata of the supervisory user's own images can be obfuscated via the control agent 14 either automatically or based on input by the supervisory user via the supervisor application 40.

The user devices 12 and supervisor device 16 operate in the network 4, which devices can be mobile and as such can be located in different geographic areas. The user devices 12 and supervisor device 16 can each include for example a smart phone or other cellular-enabled mobile device configured to operate in a wireless telecommunications network. Alternatively, the user devices 12 and supervisor device 16 can each include a personal computer, tablet device, video game console, television controller, set-top box, digital media player or other computing device. User devices 12 can be assigned to a particular user, as is typical for example with a mobile phone, or shared among more than one user, as is typical with video game consoles, television controllers, and set-top boxes.

A user operates a user device 12 with a control agent 14 active. Software and/or hardware residing on the user device 12 enables the control agent 14 to monitor and restrict use of the user device 12 and content accessible by the user device 12. Software and/or hardware residing on the user device 12 further enables messaging applications 50, for example Short Message Service ("SMS") messaging applications or applications supporting other messaging protocols, for example via 3G/4G/5G cellular protocols, WiFi™ protocol or TCP/IP through the Internet. A user can implement the messaging applications 50 for example to connect to a message forwarding center, for example via GSM wireless protocol or TCP/IP through the Internet, to communicate with other user devices 12. Social media applications 52, internet browsers 54, a location determining system 62, an operating system 64, a user interface 66, and a camera 68 are also enabled by software and/or hardware residing on the user device 12.

The control agent 14 can be configured as a standalone application executable by a processor of the user device 12 in communication with the messaging applications 50, social media applications 52, internet browsers 54, a location determining system 62, an operating system 64, a user interface 66, and a camera 68 or other communication facilitating or content providing applications or functional components of the user device 12. Alternatively, the control agent 14 can be provided as a processor-implemented add-on application integral with the messaging applications 50, social media applications 52, internet browsers 54, or other communication facilitating or content providing applications. The control agent 14 is manage and block the sharing and storage of image data including photographic and video data available to a user of the user device 12 through the messaging applications 50, social media applications 52, internet browsers 54, camera 68 or other communication facilitating or content providing applications or functional components of the user device 12.

The network-connectable processor-enabled control manager 20 is used for controlling use of the user devices 12 via the control agent 14 and communicating with a supervisory user via a supervisor application 40. The operation of the control manager 20 is described herein with respect to the user devices 12 and the supervisor device 16. One skilled in the art will recognize that the control manager 20 can operate with other suitable wired or wireless network-connectable computing systems. The control manager 20 includes a classifier engine 22, a classifier datastore 24, a user datastore 26, a supervisor application program interface ("API") 28, a control application program interface ("API")

30, a telecommunication carrier ("telecom") interface 32, and an aggregation engine 34.

The control manager 20 can be implemented on one or more network-connectable processor-enabled computing systems, for example in a peer-to-peer configuration, and need not be implemented on a single system at a single location. The control manager 20 is configured for communication via the communications network 4 with other network-connectable computing systems including the user device 12, supervisor device 16 and a telecommunication carrier system implementing an application program interface ("Telecom API") 80 enabling communications of the user device 12. Alternatively, the control manager 20 or one or more components thereof can be executed on the user device 12, supervisor device 16, or other system. The supervisor application 40 provided on the supervisor device 16 can include a downloadable software application specially configured for interface with the supervisor API 28 to receive notices from and communicate control settings to the control manager 20 via the supervisor API 28, the control settings dictating controls implemented by the control manager 20 and the control agent 14. Alternatively, the supervisor application 40 can include a generic web browser or other application allowing a user of the supervisor device 16 to receive notices from and communicate control settings to the control manager 20 via the supervisor API 28.

The control agent 14 monitors electronic communication activity, application use, and stored data, including image data, of user devices 12 operated by a supervised user. The control agent 14, or alternatively the control manager 20 via the classifier engine 22 and classifier data stored in the classifier datastore 24, infers tags from images stored on the user device 12, beneficially by using a deep learning artificial intelligence classifier. Inferred tags are correlated with sharing settings provided by a supervisory user via the supervisor application 40 by which a sharing policy can be generated for enforcement by the control agent 14 on the user device 12. Image sharing activities can be blocked and images deleted, removed, or obfuscated by such sharing policy via the control agent 14. Further, a supervisory user (e.g., a parent) is informed of trends of activities of the supervised user (e.g., a child) particularly image sharing activities and image capture activities.

Sensitive image information can include objects, surroundings, and people (e.g., user or other people) in the images. Sensitive image information can further include metadata attached to images, for example metadata defined in exchangeable image file format standard (hereinafter "Exif"). Exif metadata can include camera setting information, time and date information, image preview thumbnails, copyright information, and image descriptions. Countermeasures employed by the control agent 14 responsive to detecting sensitive information in an image can include obfuscating the image or image metadata, blurring objects in the image, and editing permissions of the image. For example metadata (e.g., Exif metadata) can be obfuscated or removed from an image prior to granting access to a non-standard or non-authorized application which attempts reading the image, Beneficially, the actions of the control agent 14 leave images intact and only change system-level permissions to the images.

Beneficially, an image classifier is built via one or both of the control agent 14 and the control manager 20 and stored in the classifier datastore 24 or by the control agent 14 on a user device 12, The image classifier is configured to designate images as sensitive or non-sensitive. A user may want to keep sensitive images private, but may allow non-sensitive images to be distributed in a more public manner. For example, the image classifier applied by the control agent or the classifier engine 22 can classify an image as public or private using image tags as inputs. Tags can be repurposed to create effective access control links. Beneficially tags are inferred from images and correlations are made between the image tags and privacy settings provided by a supervisory user via the supervisor application 40 and stored in the user datastore 26.

The control agent 14 is configured to detect images including still images and video generated by a user device 12 via a camera 68 and images transmitted to and received by the user device 12, for example via communication through the network 4. Policies including rules are applied by the control agent 14 or control manager 20 over tags of the images to determine action to be taken with respect to detected images. Policies including rules are stored in one or both of the user datastore 26 and the policy datastore 60. Particularly system-level access permissions are applied to individual image files for example to prevent access for certain applications, for example certain social media applications 52. Sharing permissions stored in the policy datastore 60 are applied to individual image files on the user device 12 by which the control agent 14 governs which parties or applications or services may receive the image files on the user device 12. An alert can be transmitted via the control agent 14 to a supervisor device 16 of a supervising user if a sensitive image is attempted to be shared by, or alternatively is stored on, a user device 12 monitored by the supervisory user.

Figure 2:
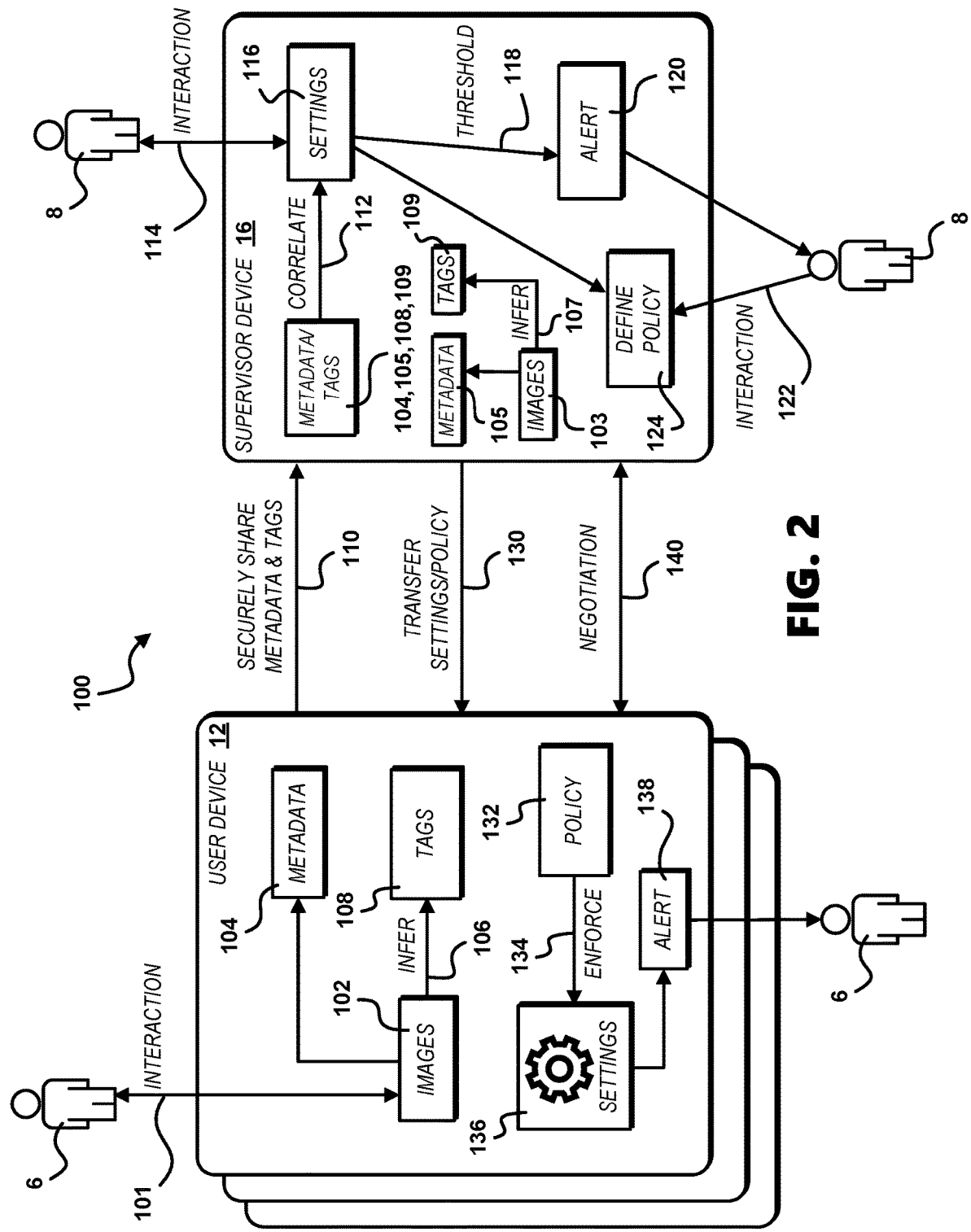
FIG. 2 shows a process flow for controlling data transmission and storage on computing devices according to the illustrative embodiments.

The system 10 via the control agent 14 and the control manager 20 is configured to derive appropriate image tags to reason about their content and sensitivity, match image tags against rules to determine if the images are sensitive, and securely share image tags between supervised user devices 12 and supervisor devices 16 (e.g., via M:N secure multi-party communication). Referring to FIG. 2, a process flow 100 enabled by the user devices 12, the control agent 14, the supervisor device 16, the supervisor application 40, and the control manager 20 is shown. A supervised user 6 is enabled to download, access, share, or otherwise interact with images 102 in an interaction 101. The images 102 are stored on the user device 12 in an image datastore 56, or alternatively are accessible to the user device 12 for example via network-based storage. Images 102 include metadata 104 and inferred image tags 108, inferred by an inferring process 106. Beneficially the inferring process 106 implements an artificial intelligence based classifier enabled either by the control agent 14 or by the classifier engine 22 of the control manager 20. The metadata 104 and the image tags 108 from each user device 12 of a particular supervised user 6 are transmitted to a supervisor device 16 in a communication 110 for example via the supervisor API 28 and the control API 30 of the control manager 20. A secure sharing protocol for example Secure Sockets Layer ("SSL") protocol, is implemented in the communication 110. The communication 110 can be further facilitated by the aggregation engine 34 which aggregates image data from a plurality of user devices 12 for transmission to the supervisor device 16. Securely sharing the image tags 108 or both the metadata 104 and the image tags 108, as opposed to sharing image files is beneficial as it lowers communication bandwidth and computer processing requirements for the user device 12, supervisor device 16, and a system executing the control manager 20 or components thereof.

In a particular implementation, the metadata 104, the image tags 108, or both can be transmitted in the communication 110 responsive to a particular frequency of identification or a particular quantity of identification of particular image tags 108 on the user device 12. For example, a communication 110 can be triggered responsive to a supervised user 6 frequently sharing (e.g., sharing greater than a threshold frequency) or sharing a large quantity (e.g., sharing greater than a threshold quantity) of images for which "party" tags 108 are inferred. The supervisory user can be queried for example whether or not to allow further sharing of images including "party" tags 108.

A supervisory user 8 is enabled to download, access, share, or otherwise interact with images 103. The images 103 are stored on the supervisor device 16 or alternatively are accessible to the supervisor device 16 for example via network-based storage. Images 103 include metadata 105 and inferred image tags 109, inferred by an inferring process 107. Beneficially the inferring process 107 implements an artificial intelligence based classifier enabled either by the supervisor application 40 or by the classifier engine 22 of the control manager 20.

The metadata 104 and the inferred image tags 108 are correlated (process 112) with settings 116 received from a supervisory user 8 through a first supervisor interaction 114. Beneficially, the settings 116 include indications of allowable sharing frequency (e.g., daily, hourly, weekly), allowable quantity of shared images (e.g., 10 pictures or 3 videos a week), types of images which can be shared (e.g., landscapes—yes, selfies—no), allowable network location (e.g., URL or domain name) or application platform where images can be shared (e.g., to Facebook™, Twitter™, or Instagram™ websites or platforms), or social network user group (e.g., friend group) where images can be shared.

A policy is defined (process 124) beneficially aggregating the correlated settings defined in the process 112. Received metadata 104 or inferred image tags 108 can trigger an alert 120 based on achieving a particular threshold 118, the alert 120 for example triggered based on the presence of a threshold number of inferred image tags 108 corresponding to sensitive subject matter or a threshold number of image tags 108 not recognized and not associated with any setting. Further settings can be received from the supervisory user 8 through a second supervisor interaction 122 responsive to the alert 120 to further define the policy (process 124). Beneficially, a feedback loop is enabled in which settings from a supervisory user 8 acquired based on generic labels are supplemented with settings from the supervisory user 8 acquired based on image tags 108 inferred from images 102 captured by or received by a user device 12 of a supervised user 6.

Aggregated settings of the defined policy are transferred to the user devices 12 of the supervised user 6 in a communication 130. A policy 132 including aggregated settings 136 is enforced (process 134) via the control agent 14 on the user devices 12 and the supervised user 6 is alerted of the enforcement by the supervised user alert 138. In response to the enforcement process 134, a supervised user 6 is enabled via the control agent 14 to request an override of enforced aggregated settings 136 and a supervisory user 8 is enabled to grant or deny an override request via a negotiation process 140.

A supervisory user 8 may desire alerts or action based on the storing or sharing of images 103 on their own supervisor device 16, for example to manage images 103 which include sensitive information which is not immediately apparent. The supervisor application 40 can enable alerts or actions based on the images 103 on the supervisor device 16 or alternatively images 103 accessible to the supervisor device 16 for example via network-based storage. The supervisory user 8 is enabled to download, access, share, or otherwise interact with the images 103. The images 103 include metadata 105 and inferred image tags 109 inferred by an inferring process 107. Beneficially, the inferring process 107 implements an artificial intelligence based classifier enabled either by the supervisor application 40 or by the classifier engine 22 of the control manager 20. The metadata 105 and the inferred image tags 109 are correlated (process 112) with settings 116 received from a supervisory user 8 through a first supervisor interaction 114. A policy is defined (process 124) beneficially aggregating the correlated settings defined in the process 112. Received metadata 105 or inferred image tags 109 can trigger an alert 120 based on achieving a particular threshold 118, the alert 120 triggered for example based on the presence of a threshold number of inferred image tags 109 corresponding to sensitive subject matter or a threshold number of image tags 109 not recognized and not associated with any setting. Further settings can be received from the supervisory user 8 through a second supervisor interaction 122 responsive to the alert 120 to further define the policy (process 124). Beneficially, a feedback loop is enabled in which settings from a supervisory user 8 acquired based on generic labels are supplemented with settings from the supervisory user 8 acquired based on image tags 109 inferred from images 103 captured by or received by a supervisor device 16 of a supervisory user 8.

Figure 3:
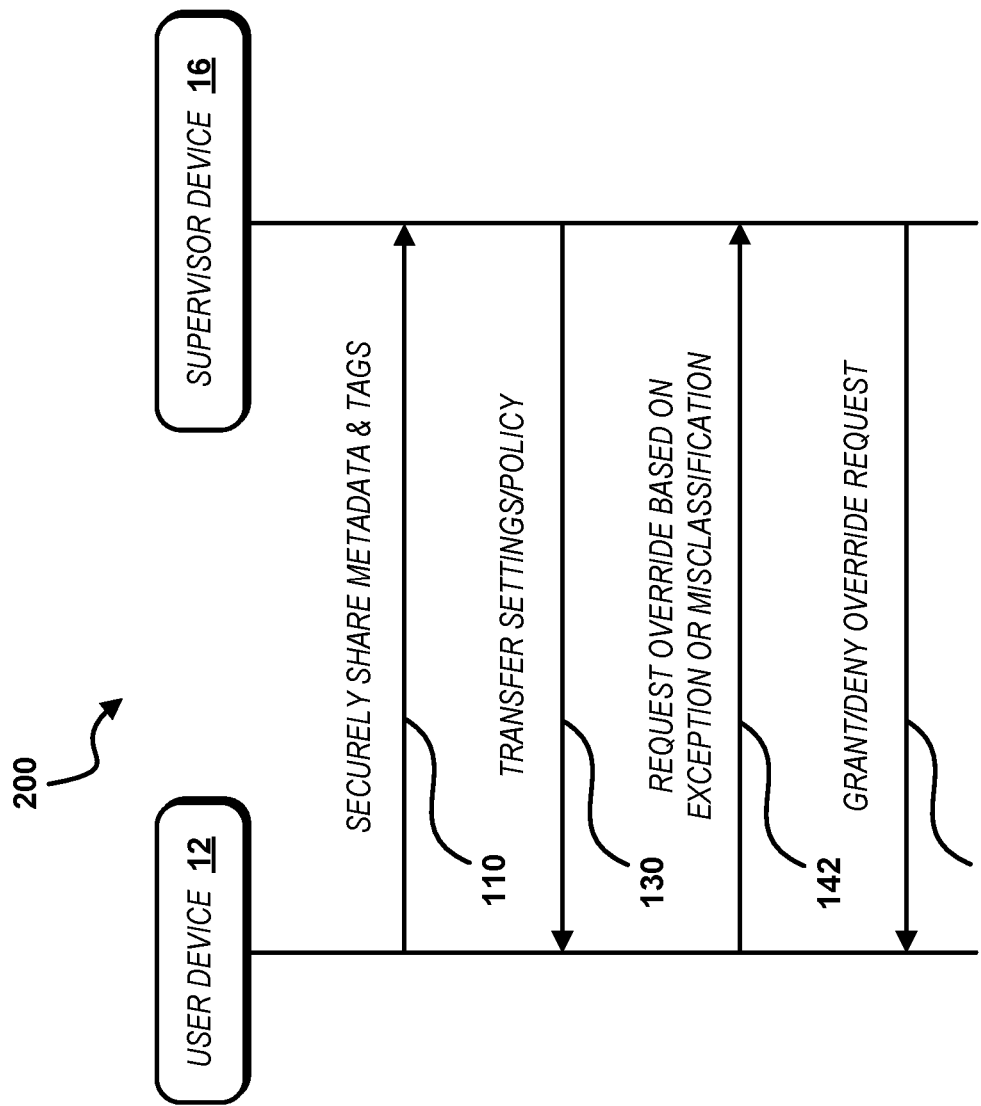
FIG. 3 shows an expansion of the process flow of FIG. 2 for controlling data transmission and storage on computing devices according to the illustrative embodiments.

Referring to FIG. 3 an expanded process flow 200 sets forth the communication 110 including the metadata 104 and the image tags 108 from the user device 12 to the supervisor device 16, and shows the communication 130 of aggregated settings from the supervisor device 16 to the user device 12. The process flow 200 further details the negotiation process 140. The negotiation process 140 firstly permits a supervised user 6 via the control agent 14 on the user device 12 in a communication 142 to request an override of a restriction based on a properly classified image (i.e., an exception) or based on a misclassification of an image. The request from the user device 12 can include explanatory text entered by the supervised user 6 for example explaining why the override should be granted. The negotiation process permits the supervisory user to grant or deny the override request (process 144) via the supervisor application 40 on the supervisor device 16.

The system 10 enables the correlating (process 112) of image tags and a supervisory user's privacy settings (e.g., file sharing settings) on multiple user devices 12 operated by a particular supervised user 6. For example a supervisory user via the supervisor application 40 can rank image tags by order of sensitivity or select tags that the supervisory user considers to be particularly sensitive. Negotiation between supervised user 6 and supervisory user (process 140) can include negotiating regarding which tags are sensitive, the number of images which can be stored or shared, target groups (e.g., social network peers) with whom images can be shared, content of shared images, frequency of image sharing, and domains with which images can be shared. The system 10 enables correlating image tags from multiple user devices 12 of a particular user for the purpose of defining, pushing, and enforcing a security policy for image sharing on the multiple user devices 12. As such a supervised user 6 is precluded from using different user devices 12 to circumvent a particular security policy, for example a security policy imposing restrictions on the frequency of sharing images.

For instance, parents may not want their children's content (e.g., photos and videos) to be shared on a publically accessible network platform (e.g., YouTube) where such content may become viral. A parent can impose settings via the supervisor application 40 such that their child can share their images (e.g., selfies) with a limited number of friends but cannot broadcast their images publicly on social media or share with more than a threshold number of people (e.g., 5, 10, or 20 people). A tag can reflect for example level of sensitivity, content type (selfie vs landscape), whether an image includes the face of a child user of the user device 12. Rules created based on a parent's interactions 114, 122 for example can include rules that allow sharing of pictures of landscapes, but do not allow sharing selfies with social media platforms.

The system 10 enables a protocol to securely share image tags 108 and metadata 104 (communication 110) between user devices 12 and the supervisor device 16 for the purpose of determining their privacy/sensitivity level. The system 10 enables negotiating exceptions or misclassifications (process 140, 142) to permit sharing by transmitting to a supervisory user the blocked images, transmitting the tags of the blocked images, or transmitting the blocked images and the tags of the blocked images.

Figure 4:
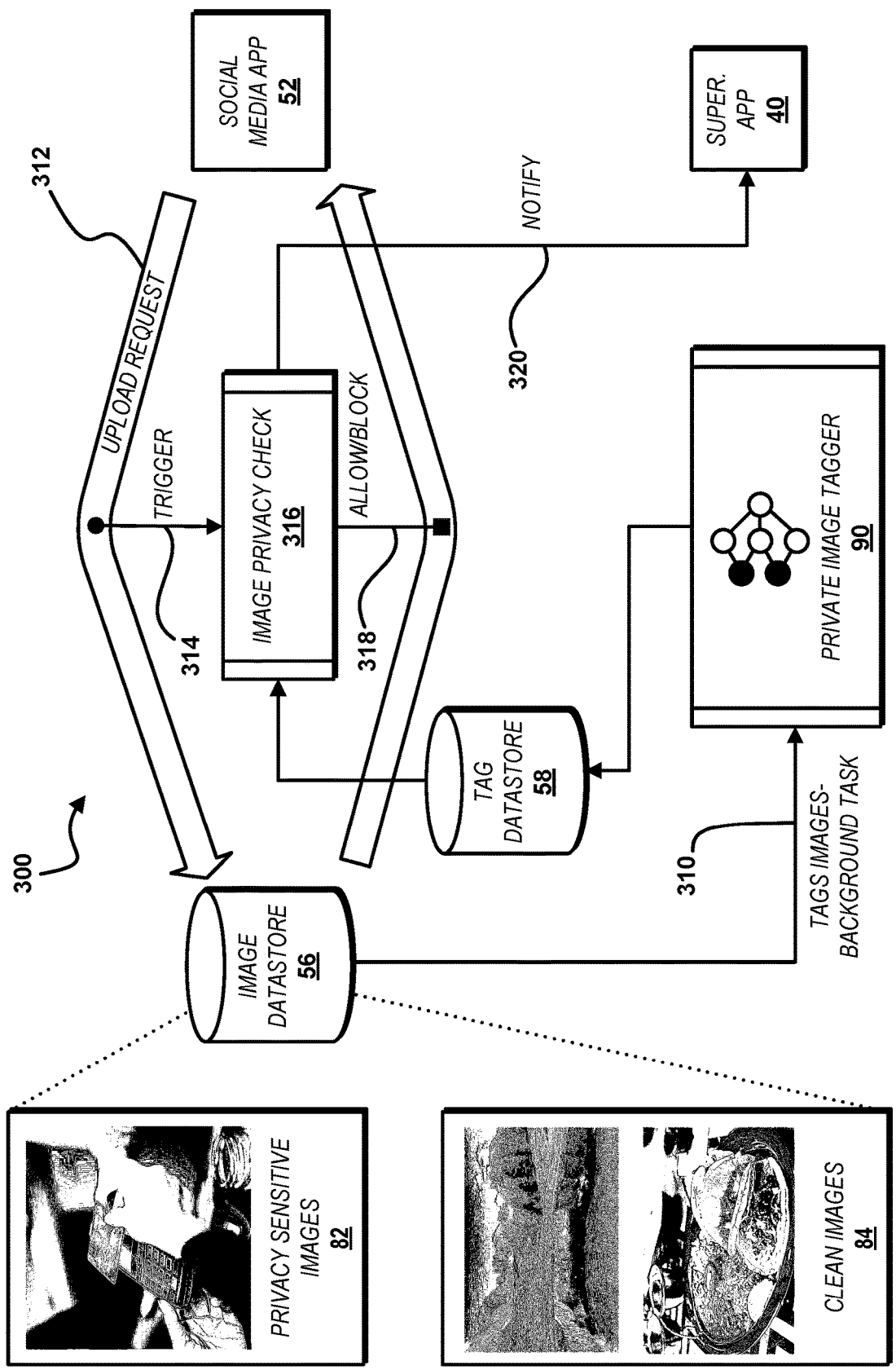
FIG. 4 shows another process flow for controlling data transmission and storage on computing devices according to the illustrative embodiments.

Referring to FIG. 4, a process flow 300 enabled by one or more user devices 12, one or more control agents 14, a supervisor device 16, a supervisor application 40, and the control manager 20 responsive to an upload request by an application is shown. In a background task, tags of images stored in the image datastore 56 of the user device 12 are inferred (step 310) using a private image tagger 90. Determined tags are stored in a tag datastore 58. When a network-connectable social media application 52 on a user device 12 requests upload of an image (step 312) from the image datastore 56, for example based on an action from a user of the user device 12, a trigger (step 314) is generated which causes the control agent 14 to perform an image privacy check (step 316). The upload request is allowed or blocked (step 318) based on the requested image, including its metadata and tags from the tag datastore 58, and whether policy settings define the requested image as a privacy sensitive image 82 or a clean (i.e., not privacy sensitive) image 84. A blocked request results in a notification (step 320) transmitted to the supervisory user via the supervisor application 40 on the supervisor device 16.

Figure 5A:
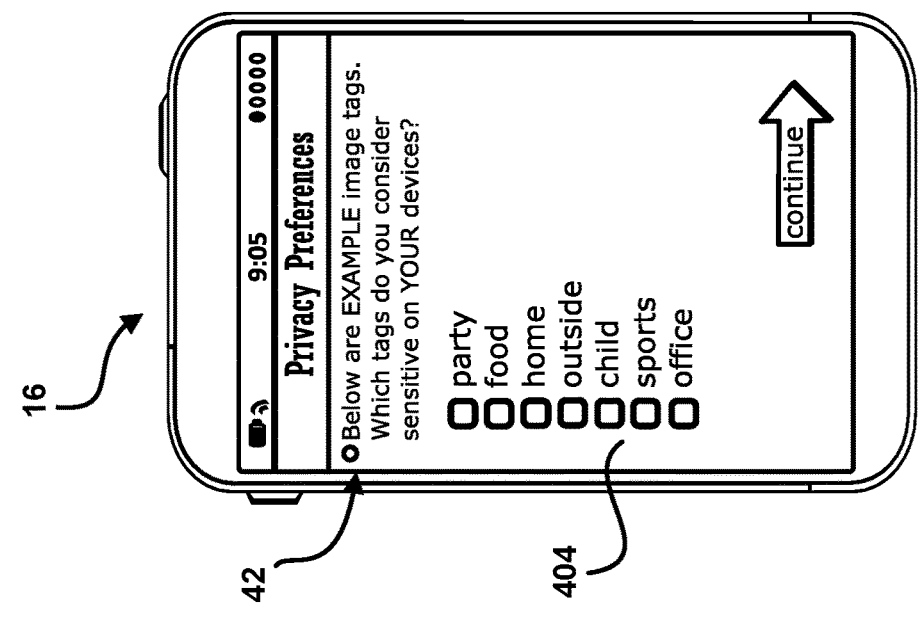

Referring to FIGS. 2 and 5A-5H, a user interface 42 enabled by the supervisor application 40 on the supervisor device 16 provides interactive displays for entering and editing control settings by a supervisory user such as a parent. Referring to FIGS. 2 and 5A, a first example interactive display 400 in a user interface 42 of the supervisor device 16 provides a supervisory user 8, in this example a parent, a list of example image tags and queries the supervisory user 8 to select example image tags which the supervisory user considers sensitive on the user device 12 of a supervised user 6 under their supervision, in this case the parent's child. The example selectable image tags in the first example interactive display 400 include "party," "food," "home," "outside," "child," and "sports." The display of and user selection of the image tags can for example constitute at least a portion of the first supervisor interaction 114 with the supervisory user 8, defining the settings 116.

Figure 5B:
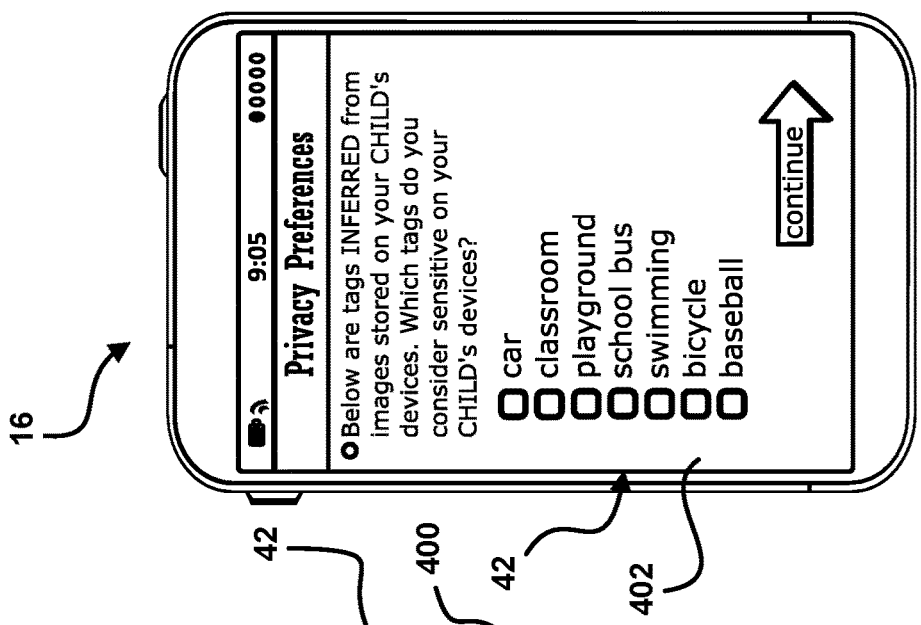

Referring to FIGS. 2 and 5B, a second example interactive display 402 in the user interface 42 enabled by the by the supervisor application 40 provides a parent supervisory user 8 a list of inferred image tags 108 inferred from images stored on one or more user devices 12 of their child, a supervised user 6, and queries the supervisory user 8 to select image tags 108 which the supervisory user 8 considers sensitive on the user device 12 of their child. The selectable inferred image tags 108 in the second example interactive display 402 include "car," "classroom," "playground," "school bus," "swimming," "bicycle," and "baseball." The display of and user selection of the inferred image tags 108 can for example constitute at least a portion of the first supervisor interaction 114 or the second supervisor interaction 122 with the supervisory user 8, defining the settings 116 and defining the policy (process 124).

Figure 5C:
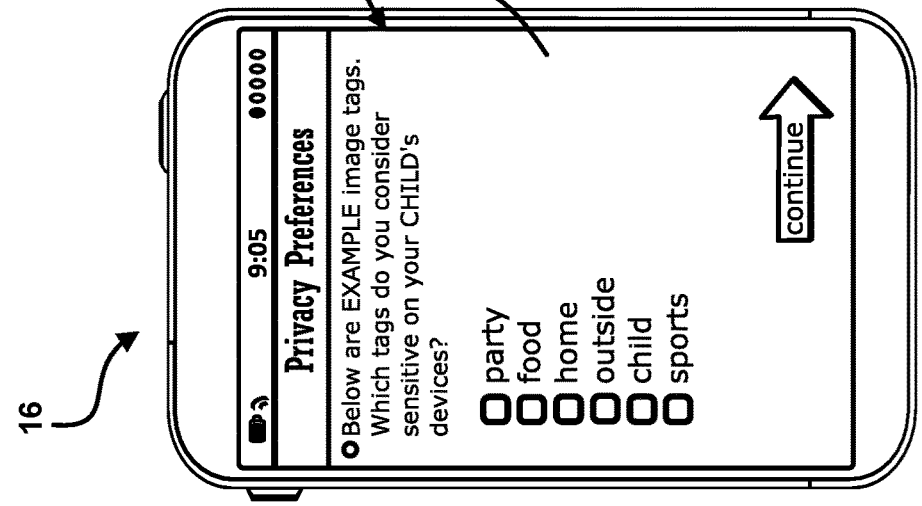

Referring to FIGS. 2 and 5C, a third example interactive display 404 in the user interface 42 provides a supervisory user 8 a list of example image tags and queries the supervisory user 8 to select image tags which the supervisory user 8 considers sensitive on one or more of their supervisor devices 16, for example their own smart phones. The example selectable example image tags in the third example interactive display 404 include "party," "food," "home," "outside," "child," "sports," and "office." The display of and user selection of the image tags can for example constitute at least a portion of the first supervisor interaction 114 with the supervisory user 8, defining the settings 116.

Referring to FIGS. 2 and 5D, a fourth example interactive display 406 in the user interface 42 provides a supervisory user 8 a list of inferred image tags 108 inferred from images stored on one or more supervisor devices 16 of the supervisory user and queries the supervisory user to select image tags 108 which the supervisory user considers sensitive on one or more of their supervisor devices 16, for example their smart phones. The example selectable inferred image tags 108 in the fourth example interactive display 406 include "alcohol," "computer," "exercise," "amusement park," "beach," and "supermarket." The display of and user selection of the inferred image tags 108 can for example constitute at least a portion of the first supervisor interaction 114 with the supervisory user 8, defining the settings 116.

Referring to FIGS. 2 and 5E, a fifth example interactive display 408 in the user interface 42 queries a supervisory user 8, a parent, to select one or more listed actions to take when one or more sensitive images are saved on a user device 12 of a supervised user 6 under their supervision, their child. The selectable actions in the fifth example interactive display 408 include "alert me," "transfer photo to secure datastore," "remove photo from child's device," "obfuscate photo metadata," and "obscure sensitive objects in photo." The display of and user selection of the selectable actions can for example constitute at least a portion of the first supervisor interaction 114 with the supervisory user 8, defining the settings 116.

Referring to FIGS. 2 and 5F, a sixth example interactive display 410 in the user interface 42 queries a supervisory user 8, a parent, to select one or more listed actions to take when one or more sensitive images are attempted to be shared on a user device 12 of a supervised user 6 under their supervision, their child. The selectable actions in the sixth example interactive display 410 include "alert me," "block sharing," "transfer photo to secure datastore," "remove photo from child's device," "obfuscate photo metadata," and "obscure sensitive objects in photo." The display of and user selection of the selectable actions can for example constitute at least a portion of the first supervisor interaction 114 with the supervisory user 8, defining the settings 116.

Referring to FIGS. 2 and 5G, a seventh example interactive display 412 in the user interface 42 queries a supervisory user 8 to select one or more listed actions to take when one or more sensitive images are saved on a supervisor device 16 of the supervisory user, for example a smart phone. The selectable actions in the seventh example interactive display 412 include "alert me," "transfer photo to secure datastore," "obfuscate photo metadata," and "obscure sensitive objects in photo." The display of and user selection of the selectable actions can for example constitute at least a portion of the first supervisor interaction 114 with the supervisory user 8, defining the settings 116.

Referring to FIGS. 2 and 5H, an eighth example interactive display 414 in the user interface 42 queries a supervisory user to select one or more listed actions to take when one or more sensitive images are attempted to be shared on a supervisor device 16 of the supervisory user, for example a smart phone. The selectable actions in the eighth example interactive display 414 include "alert me," "block sharing," "transfer photo to secure datastore," "obfuscate photo metadata," and "obscure sensitive objects in photo." The display of and user selection of the selectable actions can for example constitute at least a portion of the first supervisor interaction 114 with the supervisory user 8, defining the settings 116.

Referring to FIGS. 2, 3, and 5I, a ninth example interactive display 416 in the user interface 66 of a user device 12 includes the supervised user alert 138 in the form of a notice to a supervised user 6 (e.g., a child of a parent supervisory user 8) on a user device 12 that an attempted sharing of a particular image ("image245.jpg") 102 has been blocked, and the blocked particular image 418 is displayed. A "request override" button 420 is also displayed to allow the supervised user 6 to initiate an override request to a supervisory user. A user selection of the "request override" button 420 initiates the negotiation process 140, and more particularly initiates the override request of communication 142.

Referring to FIGS. 2, 3, and 5J, a tenth interactive display 422 in the user interface 66 provides a notice to a supervised user 6 (e.g., a child of a parent supervisory user) on a user device 12 indicating that an attempted sharing of a particular image 102 has been blocked. The image tags ("baseball" and "crowd") which triggered the blocking of the image are indicated. A "request override" button 426 is displayed to allow the supervised user 6 to transmit an override request to a supervisory user 8. The supervised user 6 is enabled to input a message in a text field 424 to send to a supervisory user 8 with the override request. A user selection of the "request override" button 426 initiates the negotiation 140, and more particularly initiates the override request of communication 142 which can include the message input in the text field 424.

Referring to FIGS. 2 and 5K, an eleventh example interactive display 430 in the user interface 42 provides the alert 120 in the form of a notice to a supervisory user 8 (e.g., a parent) on a supervisor device 16 that a particular image 102 was blocked from sharing on the user device 12 of a supervised user 6 ("Jimmy", their child). The notice indicates that a particular image 102 ("image245.jpg") was blocked from sharing on the user device 12 based on particular image tags ("baseball" and "crowd") of the particular image 102. The notice further provides a parent supervisory user 8 a list of other inferred image tags 108 inferred from the blocked particular image 102 stored on one or more user devices 12 of their child, the supervised user 6, and queries the supervisory user 8 to select image tags 108 which the supervisory user 8 considers sensitive on the user device 12 of their child. The selectable inferred image tags 108 in the eleventh example interactive display 430 include "stadium," "summer," "beer," and "concert." The display of and user selection of the inferred image tags 108 can for example constitute at least a portion of the first supervisor interaction 114 or the second supervisor interaction 122 with the supervisory user 8, defining the settings 116 and defining the policy (process 124).

Referring to FIGS. 2, 3, and 5L a twelfth example interactive display 440 in the user interface 42 provides a notice to a supervisory user 8 (e.g., a parent) on a supervisor device 16 that a supervised user 6 ("Jimmy", their child) requests override of an image share block on their user device 12. The notice is beneficially provided based on the negotiation process 140, and more particularly is provided based on the override request of communication 142. The notice indicates that a particular image 102 ("image245.jpg") was blocked from sharing on the user device 12 based on particular image tags ("baseball" and "crowd") of the particular image 102. A message box 442 includes a message from the supervised user 6 regarding the blocked particular image 102. A "deny" button 444 is provided to permit the supervisory user to initiate the grant/deny override request process 144 to deny the override request. A "grant override" button 446 is provided to permit the supervisory user to initiate the grant/deny override request process 144 to override the block and allow the supervised user 6 to share the particular image on the user device 12. A "more" button 448 can be provided to show more options or provide a new display.

Referring to FIGS. 2, 3, 5L, and 5M, a thirteenth example interactive display 450 in the user interface 42 provides a further notice to a supervisory user 8 (e.g., a parent) on a supervisor device 16 that a supervised user 6 ("Jimmy," their child) requests override of an image share block on their user device 12. The particular image 418 that was blocked from sharing on the user device 12 is shown. A "deny" button 452 is provided to permit the supervisory user to initiate the grant/deny override request process 144 to deny the override request. A "grant override" button 454 is provided to permit the supervisory user to initiate the grant/deny override request process 144 to override the block and allow the supervised user 6 to share the particular image 418. The thirteenth example interactive display 450 can be shown for example responsive to actuation of the "more" button 448 of the twelfth interactive display 440.

Figure 6:
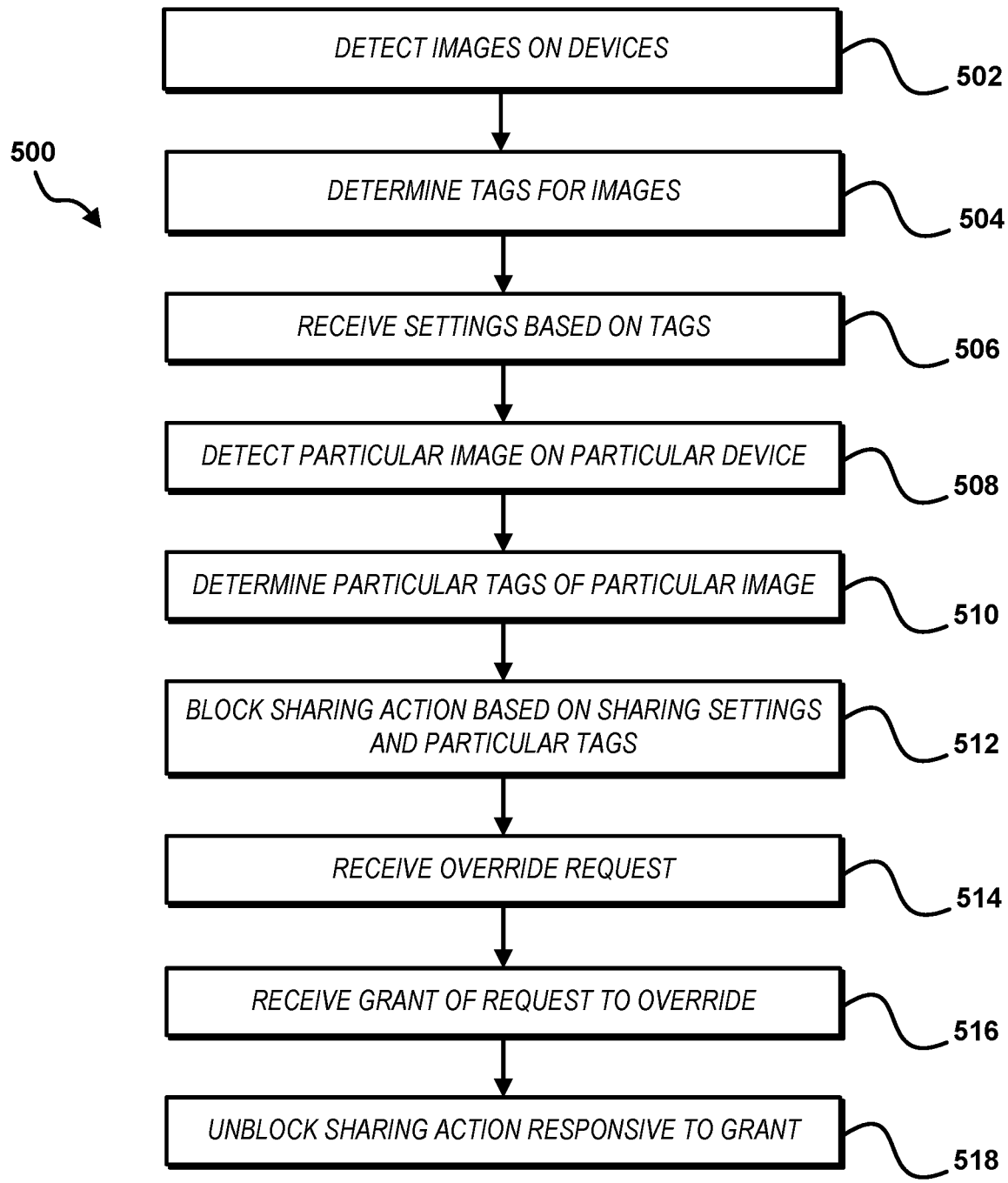
FIG. 6 is a flowchart showing a data sharing control method according to an illustrative embodiment of the invention.

Referring to FIG. 6, a flowchart shows a data sharing control method 500 for controlling data transmission on network-connectable devices. The method 500 and associated processes are described with reference to the components of the system 10 shown in FIG. 1, including the user device 12, the supervisor device 16, the processor-enabled control manager 20, the control agent 14, and the supervisor application 40. Alternatively, the method 500 can be performed via other suitable systems.

The method 500 includes detecting a plurality of images on one or more devices operated by a first user (step 502), the one or more devices including a particular device. A plurality of tags are determined for the plurality of images (step 504).

A plurality of settings are received based on the plurality of tags from a second user (step 506). Beneficially, the plurality of tags are transmitted from the one or more devices to a computing system of the second user, the second user is queried based on the plurality of tags, and the settings are received responsive to the querying. The receiving the settings can include for example receiving an indication of an allowable sharing frequency or receiving an indication of an allowable sharing target (e.g., a particular network destination, particular user, or particular user group) or a disallowable sharing target.

A particular image is detected on the particular device (step 508). Detecting the particular image can include for example detecting a particular image which had been captured by a camera of the particular device or detecting that a particular image that had been received by electronic communication by the particular device. One or more particular tags of the particular image are determined (step 510), and a sharing action of the particular image is blocked by the particular device based on the plurality of settings and the one or more particular tags (step 512). Also, beneficially an alert is transmitted to the second user based on the plurality of settings and the one or more particular tags. Other settings can be received from the second user responsive to the alert, an other particular image can be detected on the particular device, and an other sharing action of the particular image can be blocked by the particular device based on the other settings and the one or more particular tags.

The determining the plurality of tags can include for example applying an image classifier to the plurality of images. A sharing policy can be generated based on the plurality of settings and the plurality of tags, for example by a computing system of the second user, the sharing policy can be transmitted to the particular device, and the blocking by the particular device the sharing action of the particular image can be based on the sharing policy. Further, the sharing policy can be transmitted to any or all of the plurality of devices including the particular device, and a sharing action of the particular image on any or all of the plurality of devices can be blocked by any or all of the plurality of devices based on the sharing policy. Further, a ranking of the plurality of tags can be determined based on the settings, and the blocking the sharing action can be based on the ranking of the plurality of tags.

An attempt to share the particular image by the particular device can be detected, wherein the blocking the sharing action of step 512 is responsive to the detecting the attempt to share the particular image. The blocking the sharing action of step 512 can include preventing the particular image from being shared with a particular application, a particular user, or a particular user group. The blocking the sharing action of step 512 can further include preventing the particular image from being shared with more than a threshold number of targets, for example more than a threshold number of particular applications, a threshold number of particular users, or a threshold number of particular user groups. Further the blocking the sharing action of step 512 can be triggered based on comparing the one or more particular tags to the plurality of settings and determining the one or more particular tags comprise a threshold number of tags corresponding to sensitive subject matter based on the comparing, wherein the blocking the sharing action is responsive to the determining the one or more particular tags comprise the threshold number of tags corresponding to the sensitive subject matter.

In an extension to the method 500 a number of times the particular image has been shared by the first user can be determined, wherein the blocking the sharing action is further based on the determining the number of times the particular image has been shared by the first user. Alternatively, a determination can be made of a number of times that certain images comprising the one or more particular tags have been shared by the one or more devices, and the sharing action of the particular image by the particular device can be blocked further based on the number of times that the certain images comprising the one or more particular tags have been shared by the one or more devices. Alternatively, a determination can be made of a frequency that certain images comprising the one or more particular tags are shared by the one or more devices, and the sharing action of the particular image by the particular device can be blocked further based on the frequency that the certain images comprising the one or more particular tags have been shared by the one or more devices. Further, the second user can be queried regarding whether they desire to block the sharing action based on the determined frequency, an instruction to block the sharing action can be received from the second user responsive to the querying, and the sharing action can be blocked further based on the instruction from the second user.

The blocking the sharing action beneficially includes preventing transmission of the particular image from the particular device. Alternatively, the blocking the sharing action includes modifying the particular image and enabling sharing of the modified particular image. In addition to blocking the sharing action, in an extension to the method 500 the particular image can be encrypted based on the plurality of settings and the one or more particular tags. Further the particular image can be moved from a first datastore on the particular device to a second datastore on the particular device based on the plurality of settings and the one or more particular tags, the first datastore being for example an unencrypted datastore and the second datastore being for example an encrypted datastore.

Other settings can be received from the second user based on other tags, and blocking the sharing action of the particular image by the particular device can be further based on the other settings. For example, in a user intake or initiation process the second user can be queried based on other tags (e.g., generic non-user specific tags), and other settings (e.g., initial user settings) can be received from the second user based on the other tags. Later, the second user can be queried based on the plurality of tags, and the plurality of settings of step 506 can be received from the second user based on the querying the second user based on the plurality of tags, wherein the blocking the sharing action of the particular image by the particular device (step 512) is further based on the other settings (e.g., initial user settings).

The plurality of images of the method 500 beneficially include a plurality of metadata including a plurality of image location data, and the particular image beneficially includes particular metadata including particular image location data. In an extension of the method 500, a sharing policy can be determined based on the plurality of settings, the plurality of metadata, and the plurality of tags, and the sharing action of the particular image by the particular device can be blocked based on the sharing policy, the one or more particular tags, and the particular metadata.

The plurality of devices of the method 500 can include the particular device and one or more other devices, and in an extension of the method 500, one or more other sharing actions of the particular image by the one or more other devices can be blocked based on the plurality of settings and the one or more particular tags.

The method 500 beneficially further includes receiving from the first user a request to override the blocking of the sharing action (step 514), receiving from the second user a granting of the request to override the blocking of the sharing action (step 516). For example the request to override can be received from the first user (e.g., a supervised user) via a user device 12 by the control manager 20. The control manager 20 can forward the request to override to the second user (e.g., a supervisory user) via the supervisor application 40 on the supervisor device 16, and the second user can grant the request responsive to the request. The sharing action is unblocked responsive to the granting of the request from the second user (step 518). Further, explanatory text can be received from the first user, and the explanatory text can be forwarded to the second user with the request to override the blocking of the sharing action.

In an alternative implementation of the method 500, a user who operates the one or more devices (see step 502) can be the same as the user from whom the plurality of settings are received (see step 506) and who requests the override of the blocking (step 514). In such alternative implementation, the granting of the request (step 516) occurs automatically responsive to the request to override without further user input, or steps 516 and 518 are omitted, and the unblocking of the sharing action is responsive to the override request of step 514.

Figure 7:
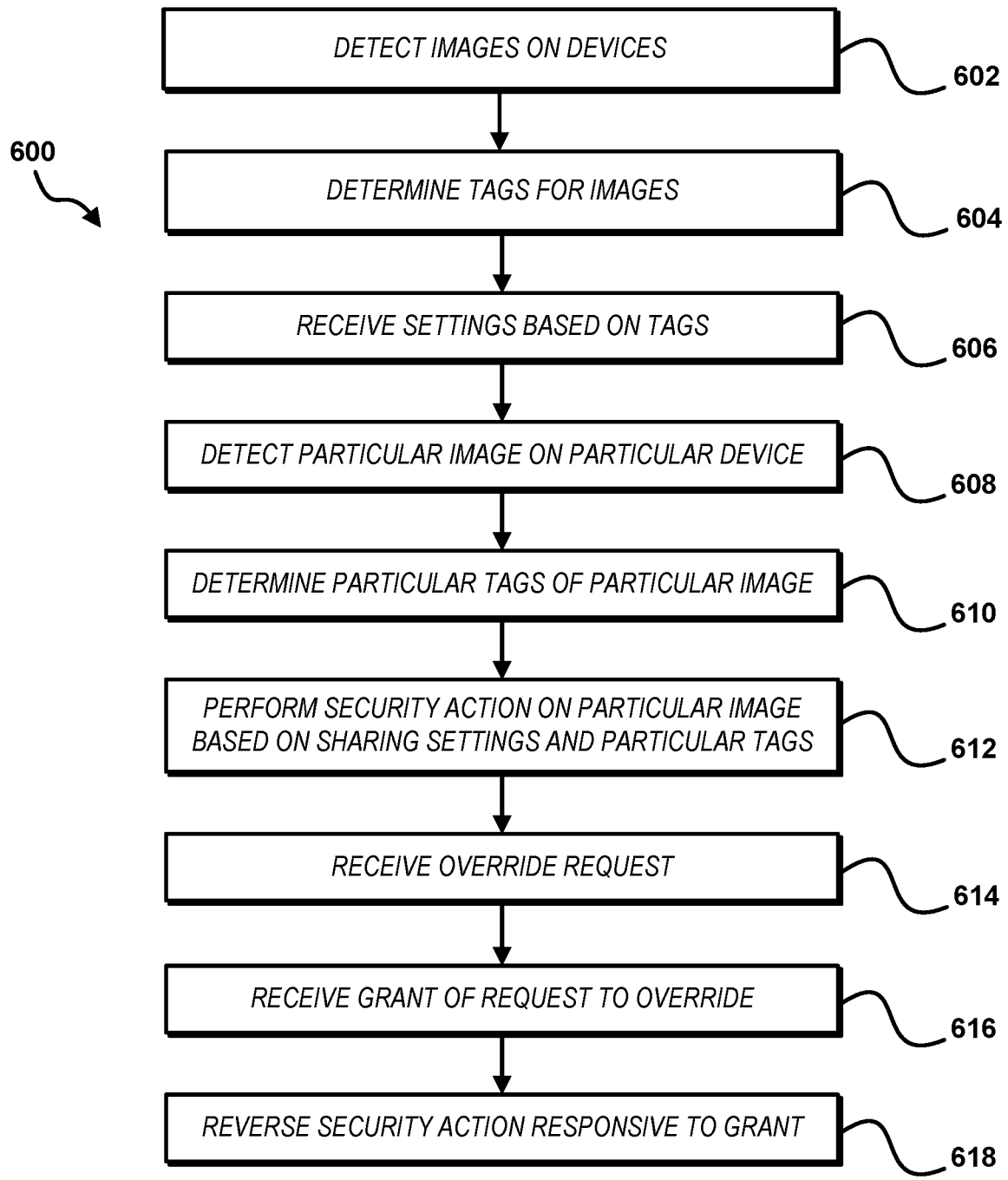
FIG. 7 is a flowchart showing a data storage control method according to an illustrative embodiment of the invention.

Referring to FIG. 7, a flowchart shows a data sharing control method 600 for controlling data transmission on network-connectable devices. The method 600 includes detecting a plurality of images on one or more devices operated by a first user (step 602), the one or more devices including a particular device. A plurality of tags are determined for the plurality of images (step 604). A plurality of settings are received based on the plurality of tags from a second user (step 606). A particular image is detected on the particular device (step 608), one or more particular tags of the particular image are determined (step 610), and a security action is performed on the particular image on the particular device based on the plurality of settings and one or more particular tags (step 612). The performing the security action can include for instance encrypting the particular image. The performing the security action can further include moving the particular image from a first datastore on the particular device to a second datastore on the particular device. Alternatively, the performing the security action can include providing a suggestion to the second user that the particular image should be one or more of removed, deleted, or transferred to a particular datastore.

In an extension to the method 600 the plurality of images can include a plurality of metadata and the particular image can include particular metadata, a policy can be determined based on the plurality of settings, the plurality of metadata, and the plurality of tags, and the security action can be performed on the particular image by the particular device based on the policy, the one or more particular tags, and the particular metadata.

The method 600 beneficially further includes receiving from the first user a request to override the performing the security action (step 614), receiving from the second user a granting of the request to override the performing the security action (step 616), and reversing the security action responsive to the granting of the request from the second user (step 618).

In an alternative implementation of the method 600, a user who operates the one or more devices (see step 602) can be the same as the user from whom the plurality of settings are received (see step 606) and who requests the override of the performing the security action (step 614). In such alternative implementation, the granting of the request (step 616) occurs automatically responsive to the request to override without further user input, or steps 616 and 618 are omitted and the unblocking of the sharing action is responsive to the override request of step 514.

Figure 8:
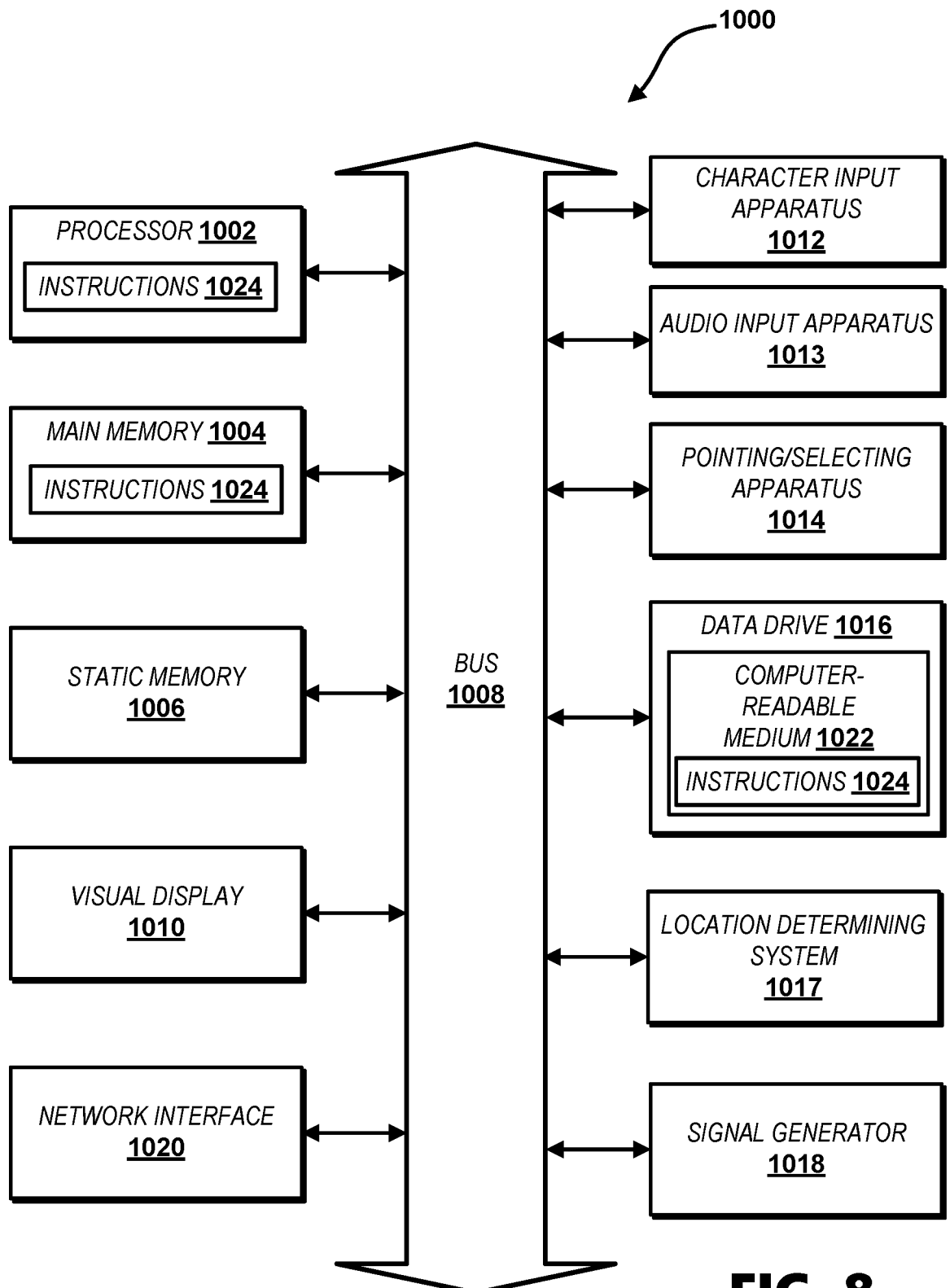
FIG. 8 shows an illustrative computer system for performing described methods according to the illustrative embodiments.

FIG. 8 illustrates in abstract the function of an exemplary computer system 1000 on which the systems, methods and processes described herein can execute. For example, the user device 12, supervisor device 16, and control manager 20 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the computer system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 4, using a signal transmission medium via the network interface 1020 operating under one or more known transfer protocols, for example FTP, HTTP, or HTTPs. Examples of communication networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
   detecting a plurality of images on at least one device operated by a first user, the at least one device comprising a first device;
   inferring a plurality of tags from the plurality of images;
   receiving from a second user via a second device a plurality of settings based on the plurality of tags;
   receiving from the second user via the second device other settings based on other tags;
   detecting a particular image on the first device;
   inferring at least one particular tag from the particular image on the first device; and
   blocking a sharing action of the particular image by the first device based on the plurality of settings, the other settings, and the at least one particular tag.

2. The method of claim 1, further comprising:
   querying the second user via the second device based on the plurality of tags; and
   receiving the plurality of settings responsive to the querying.

3. The method of claim 1, the receiving the plurality of settings comprising receiving an indication of an allowable sharing frequency.

4. The method of claim 1, the receiving the plurality of settings comprising receiving an indication of at least one of an allowable sharing target or a disallowable sharing target.

5. The method of claim 1, the receiving the plurality of settings comprising receiving an indication of at least one of an allowable type of image or a disallowable type of image.

6. The method of claim 1, the plurality of images comprising a plurality of metadata comprising a plurality of image location data, and the particular image comprising particular metadata comprising particular image location data, the method further comprising:
   determining a sharing policy based on the plurality of settings, the plurality of metadata, and the plurality of tags; and
   blocking the sharing action of the particular image by the first device based on the sharing policy, the at least one particular tag, and the particular metadata.

7. The method of claim 1, the inferring the plurality of tags comprising applying an image classifier to the plurality of images.

8. The method of claim 1, the detecting the plurality of images on the at least one device comprising detecting the plurality of images on a plurality of devices, the plurality of devices comprising the first device and another device, the method further comprising blocking another sharing action of the particular image by the another device based on the plurality of settings and the at least one particular tag.

9. The method of claim 1, further comprising:
   transmitting the plurality of tags from the at least one device to a computing system comprising the second device of the second user;
   querying the second user via the second device based on the plurality of tags; and
   receiving the plurality of settings responsive to the querying.

10. The method of claim 1, further comprising:
    transmitting the plurality of tags to a computing system comprising the second device of the second user;
    generating by the computing system a sharing policy based on the plurality of settings and the plurality of tags; and
    transmitting the sharing policy to the first device, the blocking by the first device the sharing action of the particular image based on the sharing policy.

11. The method of claim 1, the at least one device comprising a plurality of devices operated by the first user, the method further comprising:
    transmitting the plurality of tags to a computing system comprising the second device of the second user;
    generating by the computing system a sharing policy based on the plurality of settings;
    transmitting the sharing policy to the plurality of devices; and
    blocking by the plurality of devices the sharing action of the particular image on the plurality of devices based on the sharing policy.

12. The method of claim 1, the method further comprising:
    determining a ranking of the plurality of tags based on the plurality of settings; and
    blocking the sharing action based on the ranking of the plurality of tags.
13. The method of claim 1, further comprising:
    receiving from the first user a request to override the blocking of the sharing action;
    forwarding to the second user via the second device the request to override the blocking of the sharing action;
    receiving from the second user via the second device a granting of the request to override the blocking of the sharing action; and
    unblocking the sharing action responsive to the granting of the request from the second user.
14. The method of claim 13, further comprising:
    receiving explanatory text from the first user; and
    forwarding the explanatory text to the second user via the second device with the request to override the blocking of the sharing action.
15. The method of claim 1, the blocking the sharing action comprising preventing the particular image from being shared with a particular application.
16. The method of claim 1, the blocking the sharing action comprising preventing the particular image from being shared with at least one of a particular user or a particular user group.
17. The method of claim 1, the blocking the sharing action comprising preventing the particular image from being shared with more than a threshold number of targets.
18. The method of claim 1, the blocking the sharing action comprising preventing transmission of the particular image from the first device.
19. The method of claim 1, the blocking the sharing action comprising modifying the particular image and enabling sharing of the modified particular image.
20. The method of claim 1, further comprising transmitting an alert to the second user via the second device based on the plurality of settings and the at least one particular tag.
21. The method of claim 20, further comprising:
    receiving the other settings from the second user via the second device responsive to the alert;
    detecting another particular image on the first device; and
    blocking another sharing action of the another particular image by the first device based on the other settings and the at least one particular tag.
22. The method of claim 1, further comprising determining a sharing policy based on the plurality of settings and the plurality of tags, wherein the blocking the sharing action of the particular image by the first device is based on the sharing policy.
23. The method of claim 1, further comprising:
    comparing the at least one particular tag to the plurality of settings; and
    determining the at least one particular tag comprises a threshold number of tags corresponding to sensitive subject matter based on the comparing;
    wherein the blocking the sharing action is responsive to the determining the at least one particular tag comprises the threshold number of tags corresponding to the sensitive subject matter.
24. The method of claim 1, further comprising:
    detecting the particular image as captured by the first device; and
    inferring the at least one particular tag from the particular image responsive to the detecting the particular image.
25. The method of claim 1, further comprising:
    detecting the particular image as received by the first device; and
    inferring the at least one particular tag from the particular image responsive to the detecting the particular image.
26. The method of claim 1, further comprising:
    querying the second user via the second device based on the other tags;
    receiving from the second user via the second device the other settings based on the querying the second user based on the other tags;
    querying the second user via the second device based on the plurality of tags; and
    receiving from the second user the plurality of settings based on the querying the second user based on the plurality of tags.
27. The method of claim 1, further comprising encrypting the particular image based on the plurality of settings and the at least one particular tag.
28. The method of claim 27, further comprising moving the particular image from a first datastore on the first device to a second datastore on the first device based on the plurality of settings and the at least one particular tag.
29. The method of claim 1, further comprising detecting an attempt to share the particular image by the first device, wherein the blocking the sharing action is responsive to the detecting the attempt to share the particular image.
30. The method of claim 1, further comprising determining a number of times the particular image has been shared by the first user, wherein the blocking the sharing action is further based on the determining the number of times the particular image has been shared by the first user.
31. The method of claim 1, further comprising:
    determining a number of times that certain images comprising the at least one particular tag have been shared by the at least one device; and
    blocking the sharing action of the particular image by the first device further based on the number of times that the certain images comprising the at least one particular tag have been shared by the at least one device.
32. The method of claim 1, further comprising:
    determining a frequency that certain images comprising the at least one particular tag are shared by the at least one device; and
    blocking the sharing action of the particular image by the first device further based on the frequency that the certain images comprising the at least one particular tag have been shared by the at least one device.
33. The method of claim 32, further comprising:
    querying the second user via the second device based on the determined frequency whether to block the sharing action;
    receiving from the second user via the second device an instruction to block the sharing action; and
    blocking the sharing action further based on the instruction from the second user.
34. A network-enabled system comprising:
    a first computing system comprising at least a first processor and at least a first non-transitory computer readable storage medium having encoded thereon first instructions that when executed by the at least the first processor cause the first computing system to perform a first process including:
    detecting a plurality of images on the first computing system;
    inferring a plurality of tags from the plurality of images;
    transmitting via a network the plurality of tags;

detecting a particular image on the first computing system;
inferring at least one particular tag from the particular image; and
blocking a sharing action of the particular image; and
a second computing system comprising at least a second processor and at least a second non-transitory computer readable storage medium having encoded thereon second instructions that when executed by the at least the second processor cause the second computing system to perform a second process including:
receiving the plurality of tags from the first computing system;
querying a user based on the plurality of tags;
receiving a plurality of settings from the user responsive to the querying based on the plurality of tags;
querying the user based on other tags;
receiving other settings from the user responsive to the querying based on the other tags; and
transmitting the plurality of settings to the first computing system;
wherein the blocking the sharing action of the particular image by the first computing system is based on the plurality of settings, the other settings, and the at least one particular tag.

* * * * *

UNITED STATES PATENT AND TRADEMARK OFFICE
CERTIFICATE OF CORRECTION

| | |
|---|---|
| PATENT NO. | : 11,645,403 B2 |
| APPLICATION NO. | : 17/028182 |
| DATED | : May 9, 2023 |
| INVENTOR(S) | : Sadia Afroz and Armin Wasicek |

It is certified that error appears in the above-identified patent and that said Letters Patent is hereby corrected as shown below:

In the Claims

In Claim 34, at Column 21, Line 20, after the phrase "the plurality of settings", insert --and the other settings--.

Signed and Sealed this
Twenty-seventh Day of June, 2023

Katherine Kelly Vidal
*Director of the United States Patent and Trademark Office*